Jan. 30, 1951 L. R. GRAVES 2,539,997
CAR TOP FASTENER FOR BOATS AND OTHER ARTICLES
Filed Sept. 6, 1949
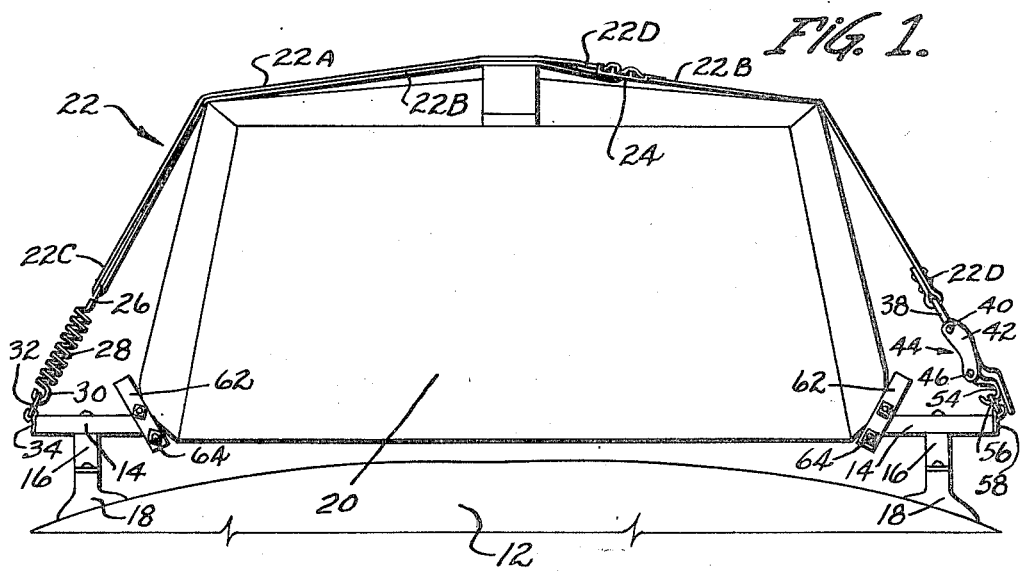
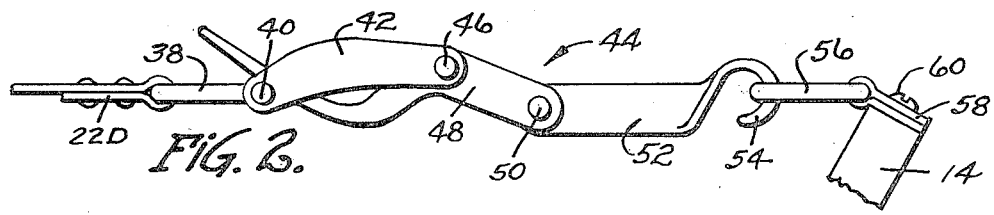
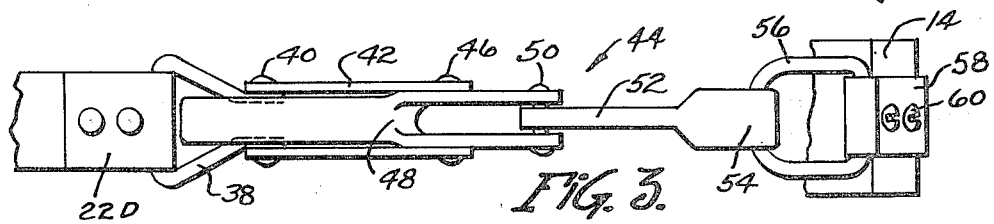
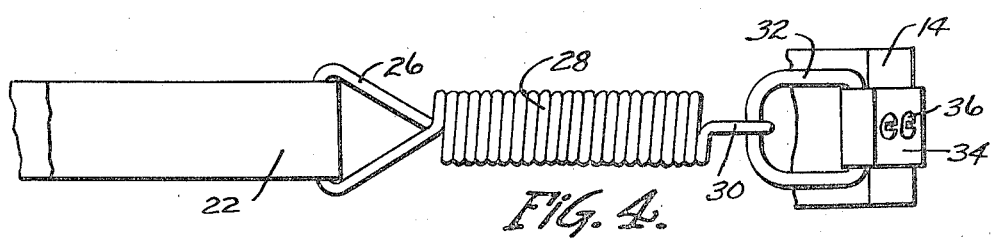
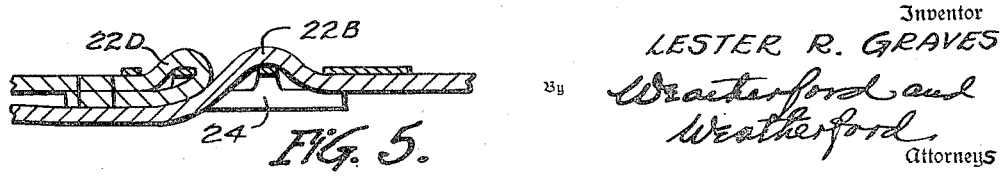
Inventor
LESTER R. GRAVES
By Weatherford and Weatherford
Attorneys Patented Jan. 30, 1951

2,539,997

UNITED STATES PATENT OFFICE 2,539,997

CAR TOP FASTENER FOR BOATS AND OTHER ARTICLES

Lester R. Graves, Memphis, Tenn.

Application September 6, 1949, Serial No. 114,225

2 Claims. (Cl. 224—42.1)

1

This invention relates to means for supporting and fastening boats or other articles on the top of an automobile or other vehicle, and has especial relation to means for quickly and easily fastening the article to the top of the vehicle and as quickly and easily releasing it.

It has become quite usual to support and fasten down boats and many other articles on the top of an automobile, and where such use is recurring to provide supports and various types of securing means, all of them, however, so far as is known, being difficult to fasten and unfasten or to adjust and tighten, particularly in cold and wet weather.

The objects of the present invention are:

To provide a hold-down assembly including a strap which is readily adjustable in length to the size of the article to be retained, resilient means for anchoring one end of the strap, and a take-up toggle for latching the opposite end of the strap.

To provide hold-down means which is quickly and easily adjusted and securely fastened, and readily released when desired.

The means by which the foregoing and other objects are accomplished and the method of their accomplishment will readily be understood from the following specification on reference to the accompanying drawings in which:

Fig. 1 is a transverse elevation of a fragmentary portion of the top of a vehicle, with a support bar mounted thereon, and an end view of an inverted boat held down on the support, and fastened thereto by a strap in accordance with my invention.

Fig. 2 is a side elevational view of an open, or extended, take-up toggle, which toggle forms part of my fastener.

Fig. 3 is a corresponding plan view of the take-up toggle.

Fig. 4 is a plan view in normally released position of a tension member or spring forming part of my device, and the means for attaching the spring to the supporting bar and strap; and Fig. 5 is a sectional elevational view of an adjusting buckle.

Referring now to the drawings in which the various parts are indicated by numerals, 12 is a fragmentary portion of the top of a vehicle above which a rectangular bar 14 is disposed and supported by brackets 16 which are secured to the vehicle top in usual manner by vacuum cups 18. Additional anchoring means is usually used for steadying these brackets, but these form no part of this invention and are not here shown.

Resting on the bar 14 and supported thereby,

2 there is shown an inverted boat 20, illustrative of an article to be secured in place, which boat or article in accordance with my invention, is held down by a substantially inextensible strap 22. One end portion 22A of the strap is folded back upon the main portion 22B thereof forming a bight 22C at one end of the main portion, and the end 22D of the folded back portion is secured to an adjusting buckle 24 through which the major portion 22B of the strap is threaded and may be shifted for adjustment when loosened, and by which under tension, it is firmly clamped. Disposed in the bight 22C of the strap is an eye 26 of substantially triangular shape in plan which preferably forms an integral part of one end of a normally closed tension spring 28, this spring having formed on its opposite end a hook portion 30. This hook portion is engaged with a link 32 secured to a clip 34, the clip being attached as by screws 36 to one end of the bar 14. The opposite end 22D of the strap is secured to an eye 38 which eye is hingedly secured by a pin 40 to side bars 42, forming part of a take-up toggle 44. The side bars 42 are connected at their opposite ends by a pin 46 with a manually operable tightener arm 48, which in turn is connected by a pin 50 to a link 52 having on its outer end a hook 54. The hook 54 is detachably engageable with an eye 56 which is secured by a clip 58 and clip attaching screws 60, to the opposite end of the bar 14, the take-up toggle arm being so shaped that when the hook 54 is engaged with the link 56, and the arm shifted to tighten the toggle, the pin 46 crosses a line connecting the pin 40 and the eye 56 and holds the take-up toggle in shortened and latched position.

The bar 14 is preferably provided with chocks 62 which can be adjusted along the bar to engage the sides of the boat or other article and clamped in adjusted position by tightening bolts 64 to prevent lateral displacement of the boat or article.

It is to be understood that ordinarily two bars such as the bar 14 and securing straps are used, but only one such bar is here shown since additional bars and straps are of substantial identity.

In use, the boat or other article to be secured is supported on the bar (or bars) and the strap 22 is thrown thereover with the spring 28 in normally closed condition. The take-up toggle 44 is opened and fully extended and the toggle hook engaged with the eye 56. The buckle 24 is shifted along main portion 22B of the strap to take up such slack as may exist and then closed, ordinarily stretching the spring 28 and securely holding down the boat or other article. Should, however, the tension prove insufficient the toggle may be opened and unhooked and additional shortening of the strap effected by further shift of the buckle 24, and this repeated if necessary, after which the toggle hook is engaged and the toggle closed. To remove the boat, the take-up link is opened, the hook 54 disconnected from the link 56 freeing the boat or article from strap confinement and allowing it to be removed. Subsequent use of the strap for securing the same boat or other article ordinarily will require no further adjustment of the strap.

I claim:

1. Means for securing articles to the top of a vehicle, which means include a horizontally disposed bar anchored to the top of the vehicle, and a hold down strap assembly; said bar having eyes respectively secured to its opposite ends; said strap assembly including a strap having one end portion folded back along the main portion thereof and forming a bight for one end of said main portion; means for adjustably securing said folded back end portion to said main portion; resilient means securing the bight end of said strap to a said eye at one end of said bar, and a manually operable take-up toggle secured to the opposite end of said strap, detachably engageable with the other of the bar carried said eyes.

2. Means for securing articles to the top of a vehicle, which means include a horizontally disposed bar anchored to the top of the vehicle, and a hold down strap assembly; said bar having eyes respectively hingedly secured to its opposite ends; said strap assembly including a strap having one end portion folded back along the main portion thereof and forming a bight for one end of said main portion; a buckle secured to the end of said folded back end portion, said main portion being threaded through said buckle and secured thereto against displacement under tension; a normally closed tension spring having at one end thereof an eye portion engaged with said bight, and at its opposite end a hook portion engaged with one of the bar carried said eyes, and a manually operable take-up toggle secured to the opposite end of said strap, said toggle having at its outer end a hook adapted for detachable engagement with the other of the bar carried said eyes.

LESTER R. GRAVES.

REFERENCES CITED

The following references are of record in the file of this patent:

UNITED STATES PATENTS

| Number | Name | Date |
| --- | --- | --- |
| 1,334,997 | Grenard | Mar. 30, 1920 |
| 1,681,936 | Hillstrom | Aug. 28, 1928 |
| 1,972,346 | Juline | Sept. 4, 1934 |
| 2,298,851 | Wachter | Oct. 13, 1942 |